US009856945B2

(12) United States Patent
Tabuchi et al.

(10) Patent No.: US 9,856,945 B2
(45) Date of Patent: Jan. 2, 2018

(54) PLANETARY GEAR TRAIN OF INTERNAL ENGAGEMENT TYPE

(71) Applicant: DENSO CORPORATION, Kariya, Aichi-pref. (JP)

(72) Inventors: Toru Tabuchi, Obu (JP); Seiji Nakayama, Obu (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 14/861,365

(22) Filed: Sep. 22, 2015

(65) Prior Publication Data

US 2016/0084348 A1   Mar. 24, 2016

(30) Foreign Application Priority Data

Sep. 24, 2014  (JP) ................................ 2014-193881

(51) Int. Cl.
*F16H 1/32*    (2006.01)
*F16H 55/08*   (2006.01)

(52) U.S. Cl.
CPC ............... *F16H 1/32* (2013.01); *F16H 55/08* (2013.01); *F16H 2001/325* (2013.01); *F16H 2055/0893* (2013.01)

(58) Field of Classification Search
CPC .................................. F16H 1/32; F16H 55/08
See application file for complete search history.

(56) References Cited

U.S. PATENT DOCUMENTS

| 1,867,492 | A | * | 7/1932 | Braren | F16H 1/32 |
| | | | | | 475/168 |
| 4,922,781 | A | * | 5/1990 | Peiji | F16H 1/32 |
| | | | | | 418/171 |
| 6,244,843 | B1 | * | 6/2001 | Kosuge | F04C 2/084 |
| | | | | | 418/150 |
| 2004/0022660 | A1 | * | 2/2004 | Eisenmann | F04C 2/084 |
| | | | | | 418/171 |
| 2005/0059524 | A1 | * | 3/2005 | Hori | F16H 1/32 |
| | | | | | 475/180 |

FOREIGN PATENT DOCUMENTS

| JP | 4107895 | 6/2008 |
| JP | 2014-35030 | 2/2014 |

* cited by examiner

*Primary Examiner* — Jacob S Scott
(74) *Attorney, Agent, or Firm* — Nixon & Vanderhye P.C.

(57) ABSTRACT

Each of gear teeth of an external gear has a tooth-bottom portion, a tooth-middle portion and a tooth-front portion. The tooth-middle portion is operatively engaged with an internal gear. A cross-sectional shape of the tooth-bottom portion is formed by a hypocycloid curved line. A cross-sectional shape of the tooth-middle portion is formed by an epicycloid curved line. A cross-sectional shape of the tooth-front portion is formed by a first predetermined curved line, which is located at a position closer to a first pitch circle of the external gear in a radial-inward direction from a reference epicycloid curved line. The reference epicycloid curved line is continuously connected to each of the curved lines of the tooth-middle portion at both circumferential sides of each gear tooth. As a result, the tooth-front portion is so formed that a part of the tooth-front portion is escaped in the radial-inward direction from the reference epicycloid curved line.

7 Claims, 12 Drawing Sheets

PLANETARY GEAR TRAIN OF INTERNAL ENGAGEMENT TYPE

CROSS REFERENCE TO RELATED APPLICATION

This application is based on Japanese Patent Application No. 2014-193881 filed on Sep. 24, 2014, the disclosure of which is incorporated herein by reference.

FIELD OF TECHNOLOGY

The present disclosure relates to a planetary gear train of an internal engagement type.

BACKGROUND

A planetary gear train of an internal engagement type is known in the art. For example, the planetary gear train of the internal engagement type is used in a speed decreasing device, a speed increasing device and so on. The planetary gear train of the internal engagement type has an internal gear and an external gear, which is internally engaged with the internal gear.

In each of an internal gear and an external gear for a planetary gear train of an internal engagement type, which is disclosed in Japanese Patent No. 4,107,895, a runout portion is formed at a bottom portion of a gear tooth. A possible contact between the bottom portion of the internal gear and a top portion of the external gear as well as a possible contact between the bottom portion of the external gear and the top portion of the internal gear is avoided by the above runout portion when the gear tooth of the external gear and the gear tooth of the internal gear are located in a teeth engagement region, in which the gear teeth of the internal gear and the gear teeth of the external gear are in engagement between them.

According to the planetary gear train of the internal engagement type disclosed in the above prior art, however, it is not always possible to prevent a possible contact between the top portion of the gear tooth of the internal gear and the top portion of the gear tooth of the external gear in a teeth non-engagement region, in which the gear teeth of the internal gear and the gear teeth of the external gear are out of engagement from each other. As a result, it is a problem that torque transmission efficiency may be decreased because of the above contact.

SUMMARY OF THE DISCLOSURE

The present disclosure is made in view of the above problem. It is an object of the present disclosure to provide a planetary gear train of the internal engagement type, according to which it is possible to prevent a decrease of torque transmission efficiency.

A first embodiment of the present disclosure relates to a cross-sectional shape of an external gear of the planetary gear train of the internal engagement type. A second embodiment of the present disclosure relates to a cross-sectional shape of an internal gear of the planetary gear train of the internal engagement type. A third embodiment of the present disclosure relates to cross-sectional shapes of the external gear and the internal gear of the planetary gear train of the internal engagement type.

In the external gear of the planetary gear train of the internal engagement type, each of external gear teeth has a tooth-bottom portion located at a radial-inside position of a first pitch circle of the external gear, a tooth-middle portion located at a radial-outside position of the first pitch circle and being operatively brought into contact with the internal gear, and a tooth-front portion located at a radial-outside position of the tooth-middle portion.

In the internal gear of the planetary gear train of the internal engagement type, each of internal gear teeth has a tooth-bottom portion located at a radial-outside position of a second pitch circle of the internal gear, a tooth-middle portion located at a radial-inside position of the second pitch circle and being operatively brought into contact with the external gear, and a tooth-front portion located at a radial-inside position of the tooth-middle portion.

The first to the third embodiments of the present disclosure have the following common features (A) to (D):

(A) a transverse cross-sectional shape of the tooth-bottom portion of each external gear tooth is formed by a hypocycloid curved line;

(B) a transverse cross-sectional shape of the tooth-middle portion of each external gear tooth is formed by an epicycloid curved line;

(C) a transverse cross-sectional shape of the tooth-bottom portion of each internal gear tooth is formed by an epicycloid curved line; and (D) a transverse cross-sectional shape of the tooth-middle portion of each internal gear tooth is formed by a hypocycloid curved line.

In addition, the first embodiment and the third embodiment of the present disclosure have the following common feature (E):

(E) a transverse cross-sectional shape of the tooth-front portion of each external gear tooth is formed by a first predetermined curved line, which is located at a position closer to the first pitch circle of the external gear in a radial-inward direction from a reference epicycloid curved line. The reference epicycloid curved line is continuously connected to each of the curved lines for the tooth-middle portion at both circumferential sides of the external gear tooth.

In addition, the second embodiment and the third embodiment of the present disclosure have the following common feature (F):

(F) a transverse cross-sectional shape of the tooth-front portion of each internal gear tooth is formed by a second predetermined curved line, which is located at a position closer to the second pitch circle of the internal gear in a radial-outward direction from a reference hypocycloid curved line. The reference hypocycloid curved line is continuously connected to each of the curved lines for the tooth-middle portion at both circumferential sides of the internal gear tooth.

According to the above features for the first and the third embodiments, a part of the tooth-front portion of each external gear tooth is escaped in the radial-inward direction from the reference epicycloid curved line.

In addition, according to the above features for the second and the third embodiments, a part of the tooth-front portion of each internal gear tooth is escaped in the radial-outward direction from the reference hypocycloid curved line.

As above, a runout portion is formed in the tooth-front portion of the external gear and/or the internal gear of the planetary gear train of the internal engagement type, in order to avoid a possible contact between the tooth-front portions of the external and the internal gears when the external gear tooth and the internal gear tooth are located in a teeth non-engagement region.

Accordingly, a friction loss can be reduced, because the possible contact between the tooth-front portions of the external and the internal gears can be avoided when the external gear tooth and the internal gear tooth are located in the teeth non-engagement region. As a result, it becomes possible to prevent a decrease of torque transmission efficiency.

In addition, it becomes possible to make larger a clearance in a radial direction between the tooth-front portions of the external and the internal gears in the teeth non-engagement region. In other words, it becomes possible to make larger a tolerance for the external and/or the internal gears. It is, therefore, possible to reduce a manufacturing cost.

In addition, it is further possible to use the runout portion as a portion for pooling grease. It is, therefore, possible to prevent a shortage of the grease.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
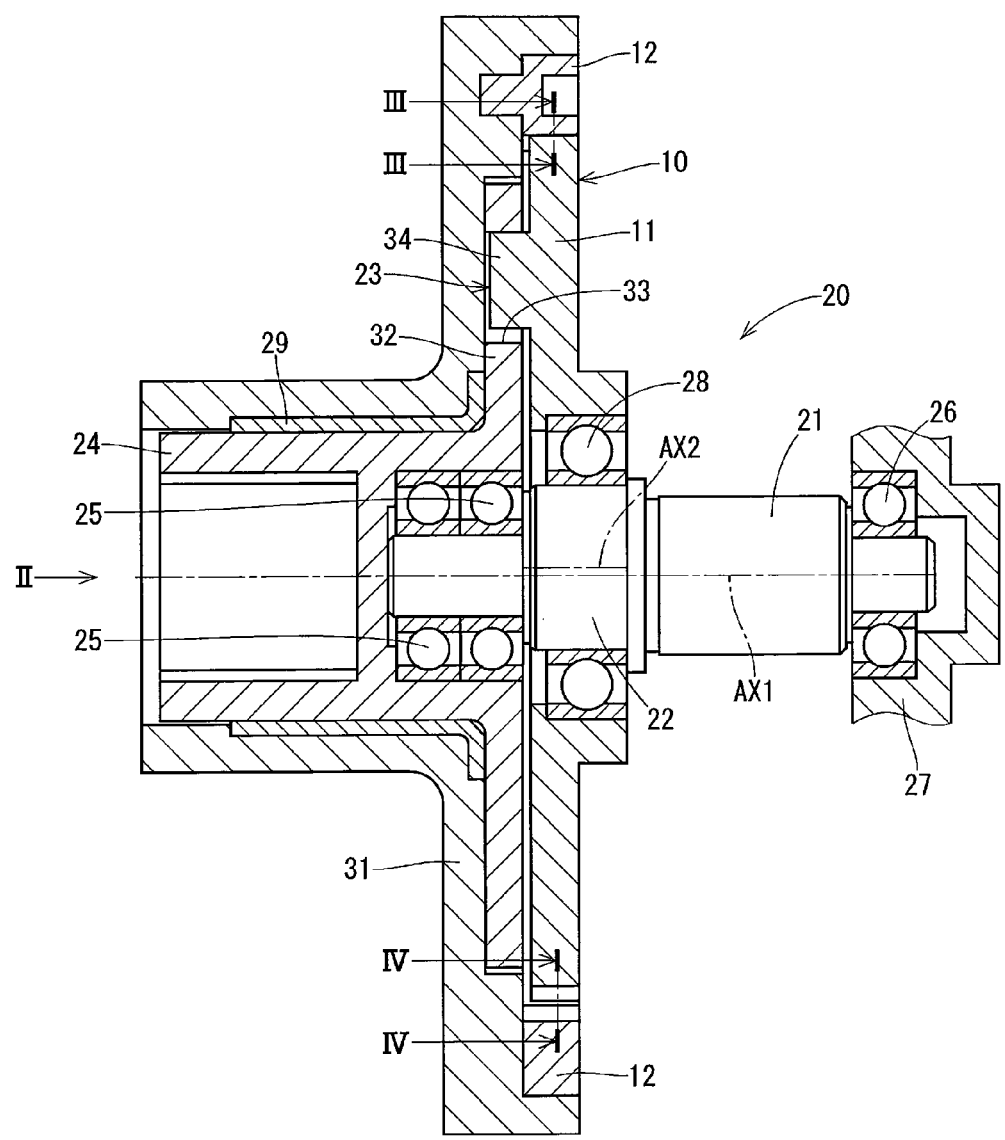
FIG. 1 is a schematic cross sectional view showing an outline of a speed decreasing device according to a first embodiment of the present disclosure, wherein a planetary gear train of an internal engagement type is used.

The present disclosure will be explained hereinafter by way of multiple embodiments and/or modifications with reference to the drawings. The same reference numerals are given to the same or similar structure and/or portion in order to avoid repeated explanation.

First Embodiment

A speed decreasing device 20 of a first embodiment of the present disclosure is shown in FIG. 1, to which a planetary gear train 10 of an internal engagement type is applied. For example, the speed decreasing device 20 is installed in a vehicle in order to decrease a rotational speed of an electric motor, which is a driving portion for a shift-by-wire system.
(Structure of Speed Decreasing Device)

Figure 2:
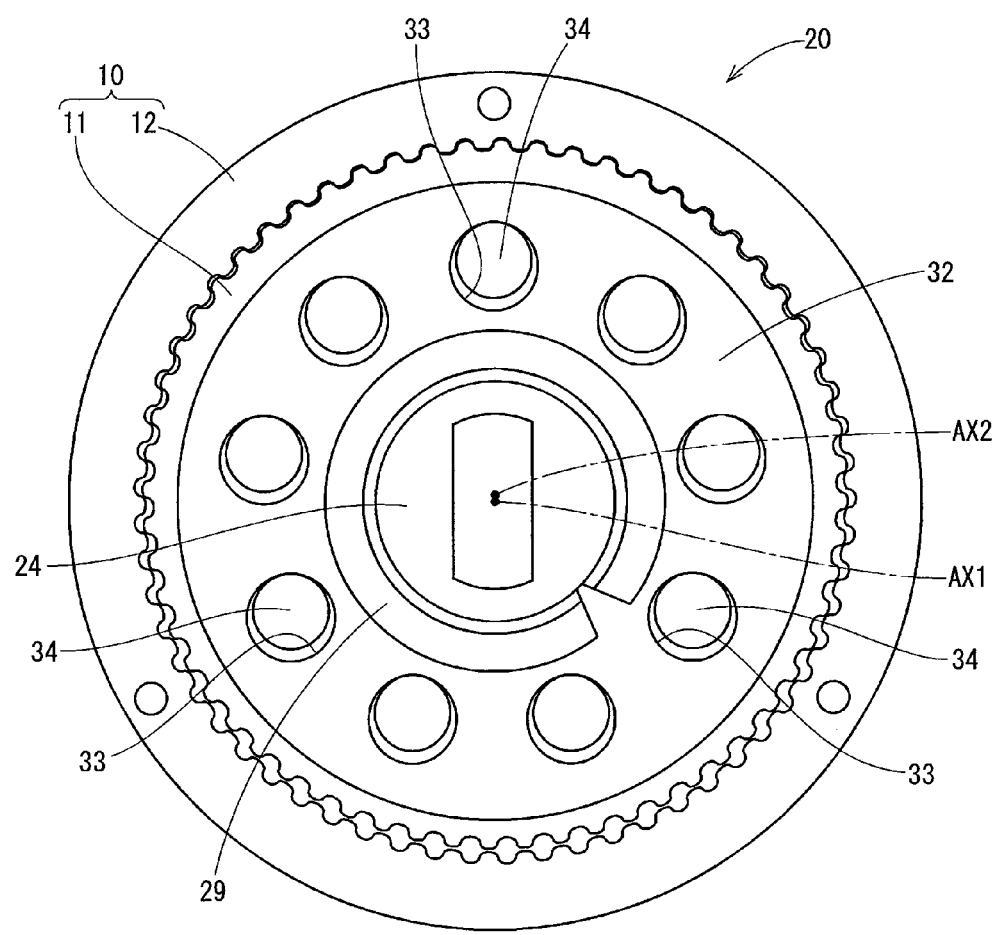
FIG. 2 is a schematic side view showing the speed decreasing device, when viewed in a direction of an arrow II in FIG. 1.

At first, a structure of the speed decreasing device 20 will be explained with reference to FIGS. 1 and 2.

The speed decreasing device 20 is composed of (but not limited thereto);

a first shaft 21;

an eccentric portion 22 formed in the first shaft 21;

an external gear 11 supported by the first shaft 21 via the eccentric portion 22, so that the external gear 11 is eccentrically rotated with respect a center axis AX1 of the first shaft 21;

an internal gear 12, with which the external gear 11 is internally engaged;

a transmission unit 23 for transmitting only a rotation component of the external gear 11 (a self-axis rotation); and a second shaft 24 connected to the external gear 11 via the transmission unit 23.

The external gear 11 and the internal gear 12 form the planetary gear train 10 of the internal engagement type.

The first shaft 21, which is an input shaft, is rotatably supported by a first roller bearing 25 provided on an axial end of the first shaft 21 (on a side to the second shaft 24) and a second roller bearing 26 provided on another axial end of the first shaft 21 (on a side opposite to the first roller bearing 25). The first roller bearing 25 is supported by the second shaft 24, while the second roller bearing 26 is supported by a rear housing 27.

The eccentric portion 22, which is eccentric to the center axial AX1 of the first shaft 21, has an eccentric center axis AX2, so that the eccentric center axis AX2 is rotated around the center axis AX1. A third roller bearing 28 is provided at an outer periphery of the eccentric portion 22.

The second shaft 24, which is an output shaft, is rotatably supported by a sliding bearing 29 provided in a front housing 31.

The internal gear 12 is coaxially arranged with the center axis AX1 of the first shaft 21 and fixed to the front housing 31.

The external gear 11 is rotatably supported by the third roller bearing 28, so that the external gear 11 moves in a sun-and-planet motion while an engagement between the external gear 11 and the internal gear 12 is maintained, when the eccentric portion 22 is rotated.

In the sun-and-planet motion, the external gear 11 is rotated around the eccentric center axis AX2 (a self-axis rotational motion) and moves around the center axis AX1 (an orbital motion).

The transmission unit 23 has multiple pin holes 33 formed in a flanged portion 32 of the second shaft 24, wherein the multiple pin holes 33 are arranged at equal intervals in a circumferential direction of the flanged portion 32. More exactly, each center of the pin holes 33 is located on a single circle. The flanged portion 32 is rotated together with the second shaft 24.

The transmission unit 23 further has multiple pins 34 formed in the external gear 11, wherein the multiple pins 34 are arranged at equal intervals in a circumferential direction of the external gear 11. In addition, each of the pins 34 is located on a single circle and loosely inserted into each of the pin holes 33. Each of the pins 34 is projected from the external gear 11 in an axial direction thereof. As a result of the loose engagement between the pins 34 and the pin holes 33, a rotation of the external gear 11 (more exactly, the rotation component of the self-axis rotational motion of the external gear 11) is transmitted to the second shaft 24.

According to the speed decreasing device 20 of the above structure, the external gear 11 as well as the eccentric portion 22 is rotated in the sun-and-planet motion, when a rotation of an electric motor (not shown) is inputted to the first shaft 21. In this operation, the speed of the self-axis rotational motion of the external gear 11 is decreased with respect to the rotation of the first shaft 21. The rotation transmitted to the second shaft 24 via the transmission unit 23 is outputted from the planetary gear train 10.

(Characterizing Features of Planetary Gear Train of Internal Engagement Type)

Now, characterizing features of the planetary gear train 10 of the internal engagement type will be explained with reference to FIGS. 3 to 6.

Hereinafter, explanation is made with reference to transverse cross-sections of the external and the internal gears 11 and 12, which are cross-sections on a plane perpendicular to the center axis AX1. A center axis of the internal gear 12 coincides with the center axis AX1 of the first shaft 21.

Figure 3:
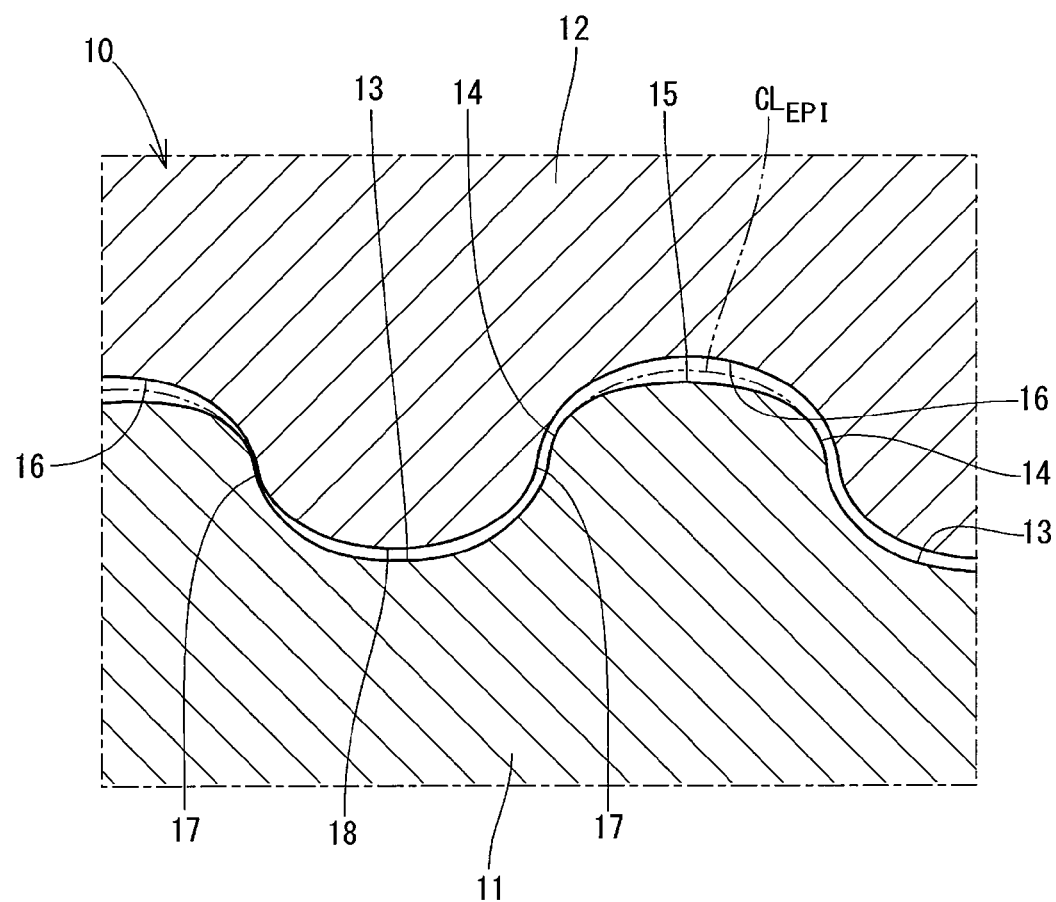
FIG. 3 is an enlarged cross sectional view taken along a line III-III in FIG. 1 and showing respective teeth of an external gear and an internal gear which are in a teeth engagement region.
Figure 4:
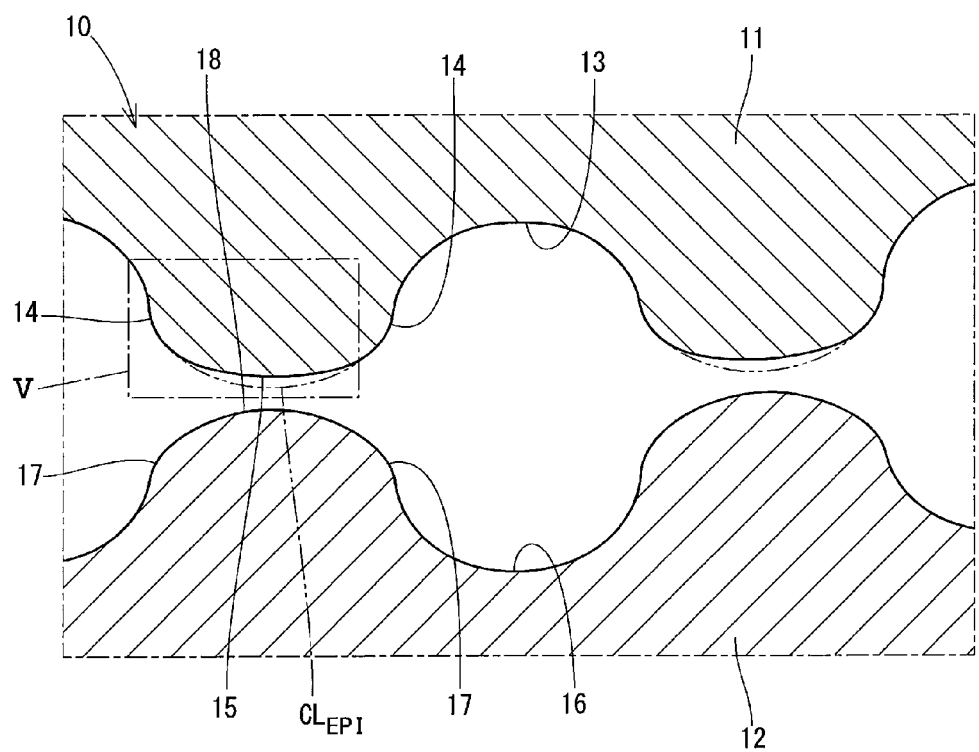
FIG. 4 is an enlarged cross sectional view taken along a line IV-IV in FIG. 1 and showing the respective teeth of the external gear and the internal gear which are in a teeth non-engagement region.
Figure 5:
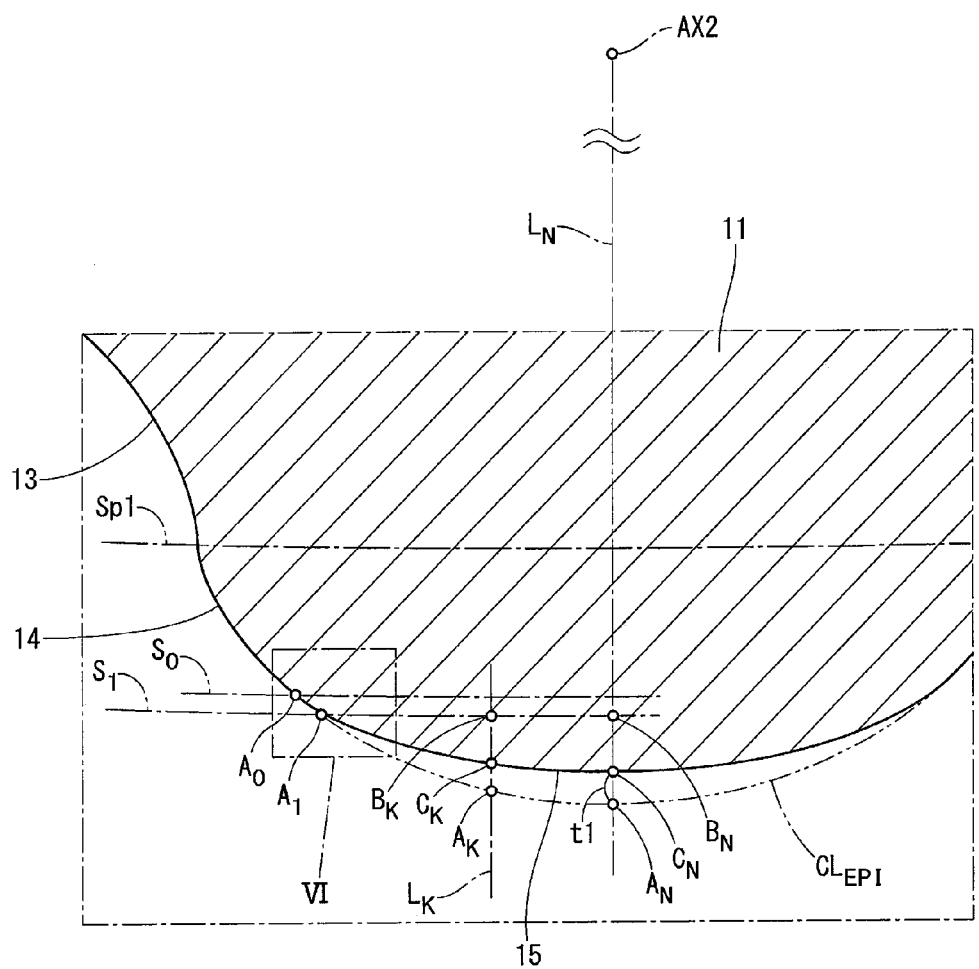
FIG. 5 is an enlarged view showing a portion V in FIG. 4, that is a portion of an external gear tooth.

As shown in FIGS. 3 and 4, an outer peripheral portion of the external gear 11 has multiple external gear teeth, each of which is composed of a tooth-bottom portion 13, a tooth-middle portion 14 and a tooth-front portion 15. As shown in FIG. 5, a pitch circle of the external gear 11 is designated by a first pitch circle "Sp1". The tooth-bottom portion 13 is located in an area inside of the first pitch circle "Sp1", that is, a radial-inside position of the first pitch circle "Sp1" (which is also referred to as a tooth-bottom side of the external gear). The tooth-middle portion 14 is located in an area outside of the first pitch circle "Sp1", that is, a radial-outside position of the first pitch circle "Sp1" (which is also referred to as a tooth-front side of the external gear). The tooth-middle portion 14 is operatively brought into contact with the internal gear 12. FIG. 3 shows a condition of a teeth engagement region, in which the external gear 11 is engaged with the internal gear 12. FIG. 4 shows a condition of a teeth non-engagement region, in which the external gear 11 is separated from the internal gear 12 in a radial direction of the internal gear 12. The tooth-front portion 15 is located in an area further outside of the tooth-middle portion 14, that is, a further radial-outside position of the tooth-middle portion 14 (on the tooth-front side of the external gear).

As shown in FIGS. 3 and 4, an inner peripheral portion of the internal gear 12 has multiple internal gear teeth, each of which is composed of a tooth-bottom portion 16, a tooth-middle portion 17 and a tooth-front portion 18. Although not shown in FIGS. 3 to 6, the internal gear 12 also has a second pitch circle "Sp2", which is, however, shown in FIG. 9 for a second embodiment of the present disclosure. Therefore, as understood from FIGS. 3 to 6 and FIG. 9, the tooth-bottom portion 16 is located in an area outside of the second pitch circle "Sp2", that is, a radial-outside position of the second pitch circle "Sp2" (which is also referred to as a tooth-bottom side of the internal gear). The tooth-middle portion 17 is located in an area inside of the second pitch circle "Sp2", that is, a radial-inside position of the second pitch circle "Sp2" (which is also referred to as a tooth-front side of the internal gear). The tooth-middle portion 17 is operatively brought into contact with the external gear 11. The tooth-front portion 18 is located in an area further inside of the tooth-middle portion 17, that is, a further radial-inside position of the tooth-middle portion 17 (on the tooth-front side of the internal gear).

A transverse cross-sectional shape of the tooth-bottom portion 16 of the internal gear 12 is formed by an epicycloid curved line, while each of transverse cross-sectional shapes of the tooth-middle portion 17 and the tooth-front portion 18 of the internal gear 12 is formed by a hypocycloid curved line.

A transverse cross-sectional shape of the tooth-bottom portion 13 of the external gear 11 is formed by the hypocycloid curved line, while a transverse cross-sectional shape of the tooth-middle portion 14 of the external gear 11 is formed by the epicycloid curved line.

A comparison example will be explained with reference to FIG. 4. In the comparison example, a transverse cross-sectional shape of the tooth-front portion 15 of the external gear 11 is formed by a reference epicycloid curved line "$CL_{EPI}$" (as indicated by a two-dot-chain line), which is continuously connected to each curved line for the tooth-middle portion 14 at both circumferential sides of the tooth-front portion 15. It is assumed in the comparison example that each dimension of respective components of the speed decreasing device coincides with a design value. It is further assumed in the comparison example that there exists no radial clearance between the tooth-front portions 15 and 18 of the external and the internal gears in the teeth non-engagement region. In such comparison example, the external gear 11 is theoretically not brought into contact with the internal gear 12 in the teeth non-engagement region between the external and the internal gears 11 and 12.

However, in an actual product, each of the dimensions of the respective components for the speed decreasing device varies within each dimensional tolerance. In addition, clearances exist among the respective components in the radial direction.

Accordingly, in the actual speed decreasing device, the external gear 11 may be located at a position, which is closer to the internal gear 12 than the position of FIG. 4. In other words, the external gear 11 may be moved from the position shown in FIG. 4 in a direction closer to the internal gear 12 due to the radial clearances between them. In such a case, the tooth-front portion 15 of the external gear 11 may be possibly brought into contact with the tooth-front portion 18 of the internal gear 12 in the teeth non-engagement region between the external and the internal gears 11 and 12.

According to the present embodiment, however, the transverse cross sectional shape of the tooth-front portion 15 of the external gear 11 is formed by a first predetermined curved line (hereinafter, a first tooth-front curved line), which is located at a position closer to the first pitch circle "Sp1" than the reference epicycloid curved line "$CL_{EPI}$" in the radial-inward direction of the external gear 11. As already explained above, the reference epicycloid curved line "$CL_{EPI}$" is continuously connected to each curved line of the tooth-middle portion 14 at both circumferential sides of the tooth-front portion 15 of the external gear 11.

In other words, in the present embodiment, a height of the external gear tooth of the external gear 11 in the radial direction thereof is made smaller than that of the comparison example (indicated by the two-dot-chain line in FIG. 4 or 5).

Figure 6:
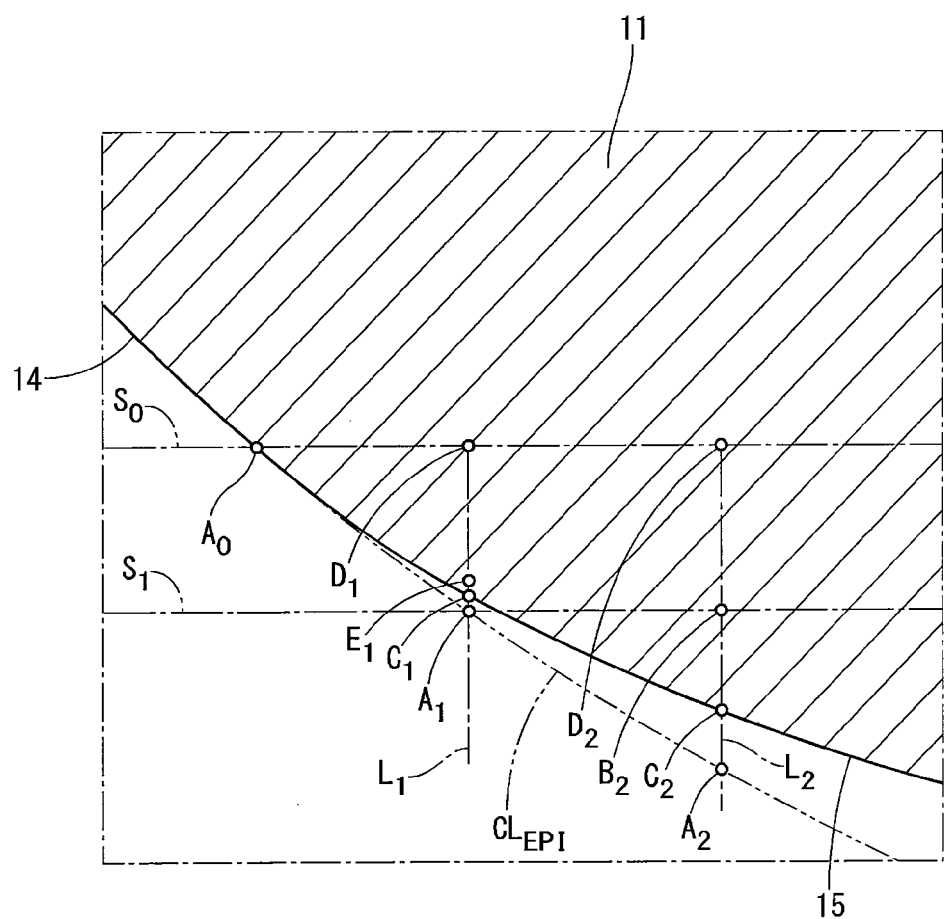
FIG. 6 is a further enlarged view showing a portion VI in FIG. 5.

The first tooth-front curved line for the tooth-front portion 15 of the external gear 11 will be further explained. In FIGS. 5 and 6, each showing the transverse cross sectional shape for the external gear tooth of the external gear 11, respective reference signs are defined as below:

(1-1) "$A_0$" is a connecting point, at which the first tooth-front curved line for the tooth-front portion 15 is continuously connected to the curved lined for the tooth-middle portion 14 (hereinafter, the connecting point "$A_0$");

(1-2) "$A_N$" is a most-front point, which is located at a most-radial-outside position of the reference epicycloid curved line "$CL_{EPI}$" (hereinafter, the most-front point "$A_N$");

(1-3) "t1" is a first runout amount, which corresponds to a distance between the most-front point "$A_N$" and a most-front point of the tooth-front portion 15 of the external gear 11 (hereinafter, the first runout amount "t1");

(1-4) "$A_1$" to "$A_{N-1}$" are points of division, each of which corresponds to respective points of division when the reference epicycloid curved line "$CL_{EPI}$" between the connecting point "$A_0$" and the most-front point "$A_N$" is equally divided into N-number portions along the reference epicycloid curved line "$CL_{EPI}$", wherein the points of division are located in a direction from the connecting point "$A_0$" to the most-front point "$A_N$" (hereinafter, the division point "$A_1$" to the division point "$A_{N-1}$");

(1-5) "$S_0$" is a circle, which is concentrically located with the first pitch circle "Sp1" and passes over the connecting point "$A_0$" (hereinafter, the first circle "$S_0$");

(1-6) "$S_1$" is a circle, which is concentrically located with the first pitch circle "Sp1" and passes over the division point "$A_1$" (hereinafter, the second circle "$S_1$");

(1-7) "$L_N$" is a straight line, which connects the most-front point "$A_N$" to the center axis "AX2" corresponding to the center of the first pitch circle "Sp1" (hereinafter, the central straight line "$L_N$");

(1-8) "$L_1$" to "$L_{N-1}$" are straight lines, each of which is parallel to the central straight line "$L_N$" and passes over the respective division points "$A_1$" to "$A_{N-1}$" (hereinafter, the straight lines "$L_1$" to "$L_{N-1}$");

(1-9) "$B_2$" to "$B_N$" are intersection points, at each of which the second circle "$S_1$" intersects with the respective straight lines "$L_2$" to "$L_N$" (hereinafter, the intersection points "$B_2$" to "$B_N$");

(1-10) "$C_N$" is a runout point, which corresponds to the most-front point "$A_N$" when the most-front point "$A_N$" is moved by the first runout amount "t1" in a direction to the intersection point "$B_N$" along the central straight line "$L_N$" (hereinafter, the central runout point "$C_N$");

(1-11) "K" is an integral number from "2 (two)" to "N−1" (hereinafter, the integral number "K");

(1-12) "$C_K$" is a runout point, which is located on the straight line "$L_K$" and satisfies the following condition

[a line segment "$A_K C_K$":a line segment "$C_K B_K$"=a line segment "$A_N C_N$":a line segment "$C_N B_N$"]

(hereinafter, the runout point "$C_K$");

(1-13) "$D_2$" is an intersection point between the straight line "$L_2$" and the first circle "$S_0$" (hereinafter, the intersection point "$D_2$");

(1-14) "$D_1$" is an intersection point between the straight line "$L_1$" and the first circle "$S_0$" (hereinafter, the intersection point "$D_1$");

(1-15) "$E_1$" is a transfer point, which is located on the straight line "$L_1$" and satisfies the following condition

[a line segment "$A_1 E_1$":a line segment "$E_1 D_1$"=a line segment "$A_2 C_2$":a line segment "$C_2 D_2$"]

(hereinafter, the transfer point "$E_1$"); and (1-16) "$C_1$" is a runout point, which is a middle point between the division point "$A_1$" and the transfer point "$E_1$".

The tolerances of the respective parts and/or components as well as clearances among the respective parts and/or components are taken into consideration when deciding the first runout amount "t1". Namely, the first runout amount "t1" is so decided that a possible contact between the tooth-front portions 15 and 18 of the external gear 11 and the internal gear 12 can be avoided in the teeth non-engagement region (in the condition of FIG. 4) between the external and the internal gears 11 and 12.

The connecting point "$A_0$" is decided as such a position (a position on a face of the external gear tooth of the external gear 11), which is closer to the first pitch circle "Sp1" as much as possible to an extent that the tooth-front portion 15 of the external gear 11 is not brought into contact with the tooth-front portion 18 of the internal gear 12 (that is, in a range which does not make a contribution to a torque transmission). The above extent (the range) is experimentally obtained based on a wear status of the face of the external gear tooth of the external gear 11. Namely, the wear status is obtained by way of experiment, in which the planetary gear train 10 of the internal engagement type is operated, wherein the transverse cross-sectional shape of the tooth-front portion 15 of the external gear 11 is formed by the reference epicycloid curved line "$CL_{EPI}$".

A division number "N" is properly selected from numbers from 10 to 50. A ratio of the line segment (that is, the line segment "$A_N C_N$": the line segment "$C_N B_N$") is properly selected from a range of ratio between "1:9" and "3:2".

In the present embodiment, the division number "N" is decided as "50" and the ratio of the line segment "$A_N C_N$: $C_N B_N$" is decided as "1:2". Then, the ratio of the line segment (the line segment "$A_2 C_2$":the line segment "$C_2 D_2$") becomes almost "1:9".

The transverse cross-sectional shape of the tooth-front portion 15 (that is, the first tooth-front curved line) is an interpolation curved line, which passes over the connecting point "$A_0$" and the runout points "$C_1$" to "$C_N$" respectively defined by the above definitions (1-1) to (1-16). For example, a spline curved line is used for the interpolation curved line.

The runout point "$C_1$" is so decided based on the above definitions (1-13) to (1-16) that each of the interpolation curved lines becomes a convex curved line expanding in a radial-outward direction.

Advantages of First Embodiment

As explained above, the transverse cross-sectional shape of the tooth-front portion 15 of the external gear 11 is formed by the first tooth-front curved line, which is located at the position closer to the first pitch circle "Sp1" than the reference epicycloid curved line "$CL_{EPI}$" in the radial-inward direction of the external gear 11. The reference epicycloid curved line "$CL_{EPI}$" is continuously connected to each of the curved lines for the tooth-middle portion 14 at both circumferential sides of the tooth-front portion 15 of the external gear 11.

According to the above structure, the tooth-front portion 15 of the external gear 11 is so formed that each point on the first tooth-front curved line is escaped in the radial-inward direction from the reference epicycloid curved line "$CL_{EPI}$".

In other words, when compared with the comparison example having the reference epicycloid curved line "$CL_{EPI}$" at the tooth-front portion of the external gear, the tooth-front portion 15 of the present embodiment has the runout portion in order to avoid the possible contact with the tooth-front portion 18 of the internal gear 12.

According to the present embodiment, therefore, it is possible to avoid the contact between the tooth-front portions 15 and 18 of the external gear 11 and the internal gear 12 in the teeth non-engagement region between the external and the internal gears 11 and 12, as shown in FIG. 4. As a result, it is possible to avoid the decrease of the torque transmission efficiency.

As a result that the radial clearance between the tooth-front portions 15 and 18 of the external and the internal gears 11 and 12 can be made larger, the tolerances for the external and the internal gears 11 and 12 can be correspondingly made larger. It is, therefore, possible to reduce a manufacturing cost for the gears 11 and 12.

In addition, it is possible to use the runout portion as a portion for accumulating grease. It is, thereby, possible to prevent a shortage of the grease.

In the present embodiment, the transverse cross-sectional shape of the tooth-front portion 15 is formed by the interpolation curved line, which passes over the connecting point "$A_0$" and the runout points "$C_1$" to "$C_N$" respectively defined by the above definitions (1-1) to (1-16).

According to the above structure, it is possible not only to escape a part of the tooth-front portion 15 by the desired first runout amount "t1" in the radial-inward direction from the reference epicycloid curved line "$CL_{EPI}$" but also to form the outer shape of the tooth-front portion 15 by the smoothly convex curved line expanded in the radial-outward direction. As a result, even when an unexpected external force is applied to the speed decreasing device 20 and the tooth-front portions 15 and 18 of the external gear 11 and the internal gear 12 are brought into contact with each other (for example, because of a deformation of the external gear 11), the tooth-front portion 15 of the external gear 11 does not get stuck with the tooth-front portion 18 of the internal gear 12 but does smoothly slide on the tooth-front portion 18 of the internal gear 12. Accordingly, it is possible to avoid a situation that the rotation of the external gear 11 is locked by an unexpected engagement (a getting-stuck condition) between the external gear 11 and the internal gear 12 in the teeth non-engagement region.

First Modification of First Embodiment

The above definition (1-4) for the division points "$A_1$" to "$A_{N-1}$" may be modified in the following manner.

(1-4: First modification) "$A_1$" to "$A_{N-1}$" are points of division, each of which corresponds to respective points of division when the reference epicycloid curved line "$CL_{EPI}$" between the connecting point "$A_0$" and the most-front point "$A_N$" is divided into N-number portions at equal angles around the center of the first pitch circle "Sp1", wherein the points of division are located in a direction from the connecting point "$A_0$" to the most-front point "$A_N$" (hereinafter, the division point "$A_1$" to the division point "$A_{N-1}$");

Second Modification of First Embodiment

The above definition (1-4) for the division points "$A_1$" to "$A_{N-1}$" may be further modified in the following manner.

(1-4: Second modification) "$A_1$" to "$A_{N-1}$" are points of division, each of which corresponds to respective points of division when a first predetermined curved line between the connecting point "$A_0$" and the most-front point "$A_N$" is divided into N-number portions, wherein the points of division are located in a direction from the connecting point "$A_0$" to the most-front point "$A_N$". The reference epicycloid curved line "$CL_{EPI}$" and a pair of curved lines for the tooth-middle portion respectively connected to each end of the reference epicycloid curved line "$CL_{EPI}$" (which correspond to curved lines forming the transverse cross-sectional shape of the tooth-middle portion at both circumferential sides of the tooth-front portion) are replaced by the above first predetermined curved line.

The first predetermined curved line is obtained in the following manner;

A first rolling circle having a radius "a" is circumscribed to the first pitch circle "Sp1" (having a radius "r1"). The first rolling circle is rotated around the center of the first pitch circle "Sp1" by an angle of "360×a/r1", while a circumscribed condition is maintained between the first rolling circle and the first pitch circle "Sp1". A certain point on the circumference of the first rolling circle draws a curved line during the above rotation by the angle of "360×a/r1", which corresponds to the above first predetermined curved line (an epicycloid curved line).

In addition, the first predetermined curved line coincides with a spline curved line, which is obtained in the following manner;

A value "x" and a value "y" are respectively calculated from the following formulas (1) and (2):

$$x = (r1+a) \times \sin(360 \times a \times s/r1) - a \times \sin(360 \times (r1+a) \times s/r1) \quad (1)$$

$$y = (r1+a) \times \cos(360 \times a \times s/r1) - a \times \cos(360 \times (r1+a) \times s/r1) \quad (2)$$

Multiple values for "x" and "y" are obtained from the above formulas (1) and (2) by changing "s" in a range between "0" and "1" at intervals of "1/M". "M" is set at a value, for example, "50". The spline curved line is obtained as a curved line, which passes over all of points plotted by the respective values of "x" and "y".

Second Embodiment

Characterizing features of the planetary gear train of the internal engagement type according to a second embodiment of the present disclosure will be explained with reference to FIGS. 7 to 10.

Figure 7:
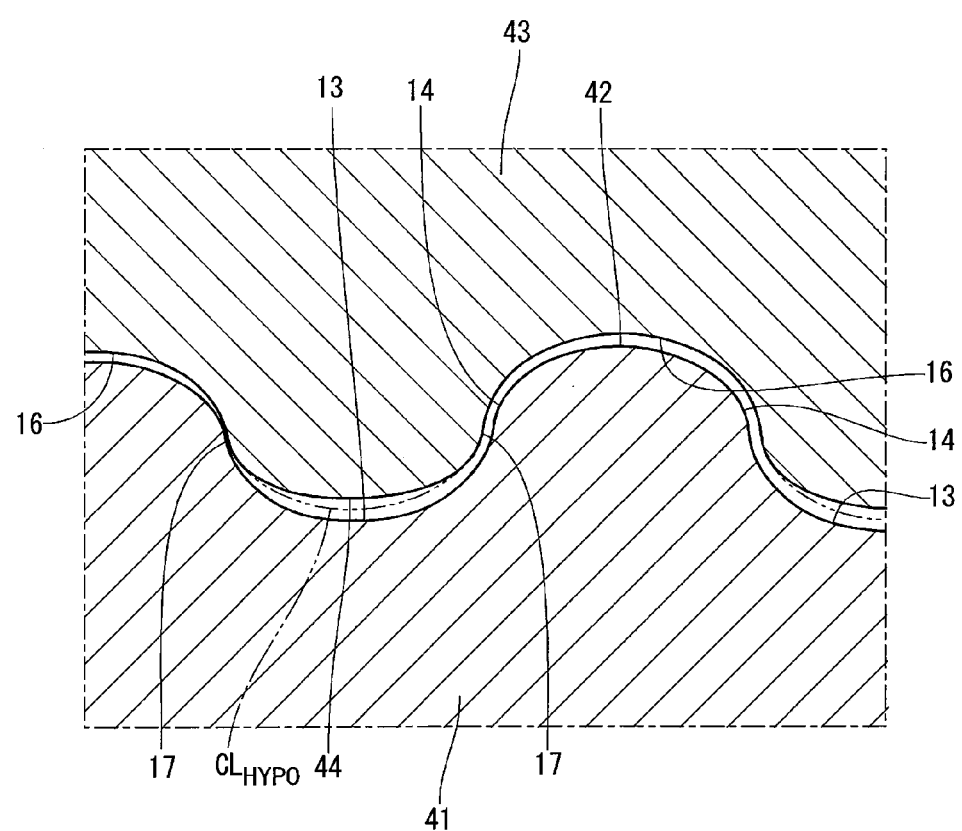
FIG. 7 is an enlarged schematic cross sectional view showing a portion of the speed decreasing device according to a second embodiment of the present disclosure, namely showing respective teeth of the external gear and the internal gear which are in the teeth engagement region like FIG. 3.
Figure 8:
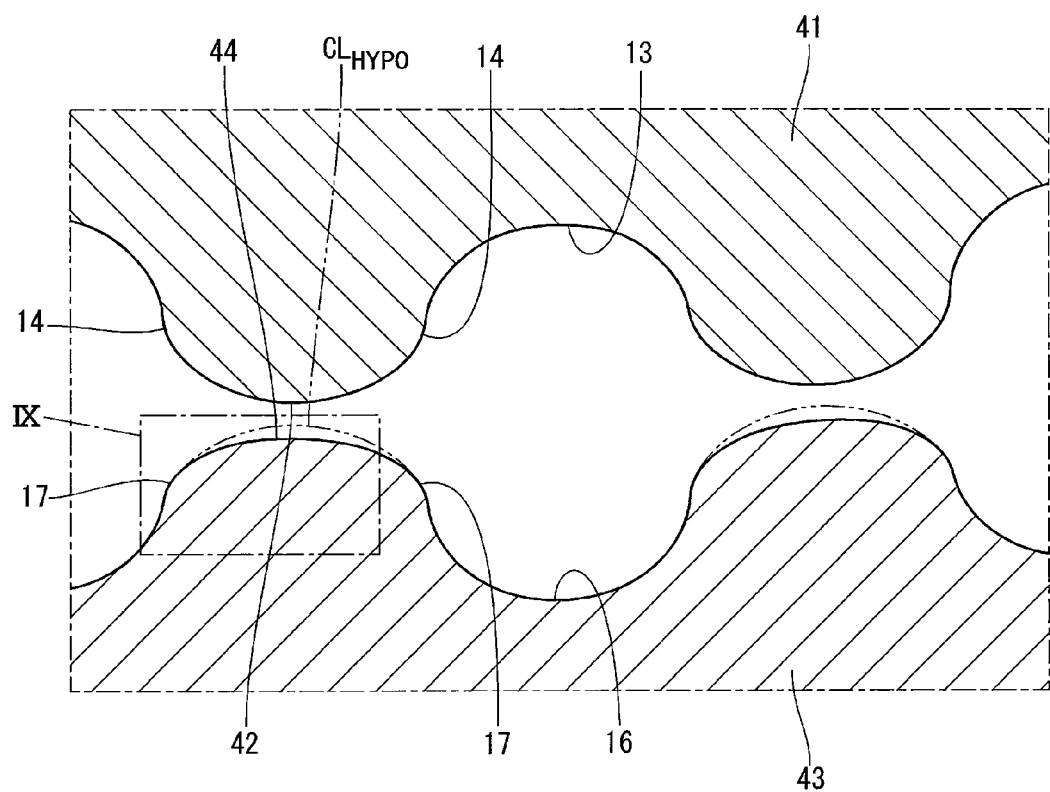
FIG. 8 is an enlarged schematic cross sectional view showing a portion of the speed decreasing device according to the second embodiment of the present disclosure, namely showing the respective teeth of the external gear and the internal gear which are in the teeth non-engagement region like FIG. 4.

As shown in FIGS. 7 and 8, an outer peripheral portion of an external gear 41 has multiple external gear teeth, each of which is composed of the tooth-bottom portion 13, the tooth-middle portion 14 and a tooth-front portion 42. A transverse cross-sectional shape of the tooth-front portion 42 of the external gear 41 is formed by an epicycloid curved line.

An inner peripheral portion of an internal gear 43 has multiple internal gear teeth, each of which is composed of the tooth-bottom portion 16, the tooth-middle portion 17 and a tooth-front portion 44.

A transverse cross-sectional shape of the tooth-front portion 44 of the internal gear 43 is formed by a second predetermined curved line (a second tooth-front curved line for the internal gear 43), which is located at a position closer to the second pitch circle "Sp2" than a reference hypocycloid curved line "$CL_{HYPO}$". The reference hypocycloid curved line "$CL_{HYPO}$" for the tooth-front portion 44 is continuously connected to each of the curved lines for the tooth-middle portion 17 at both circumferential sides of the tooth-front portion 44 of the internal gear 43.

Figure 9:
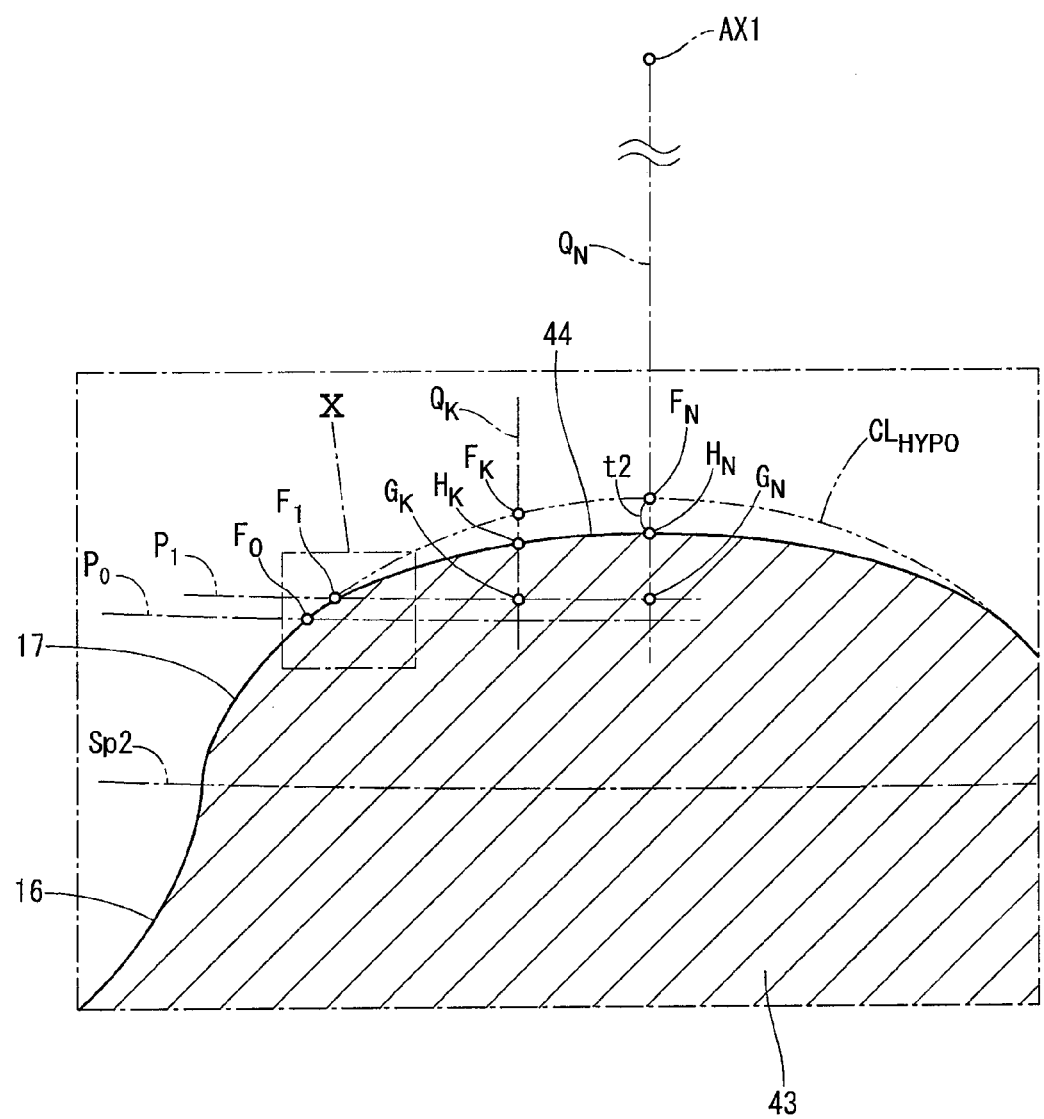
FIG. 9 is an enlarged view showing a portion IX in FIG. 8, that is, a portion of the internal gear tooth.
Figure 10:
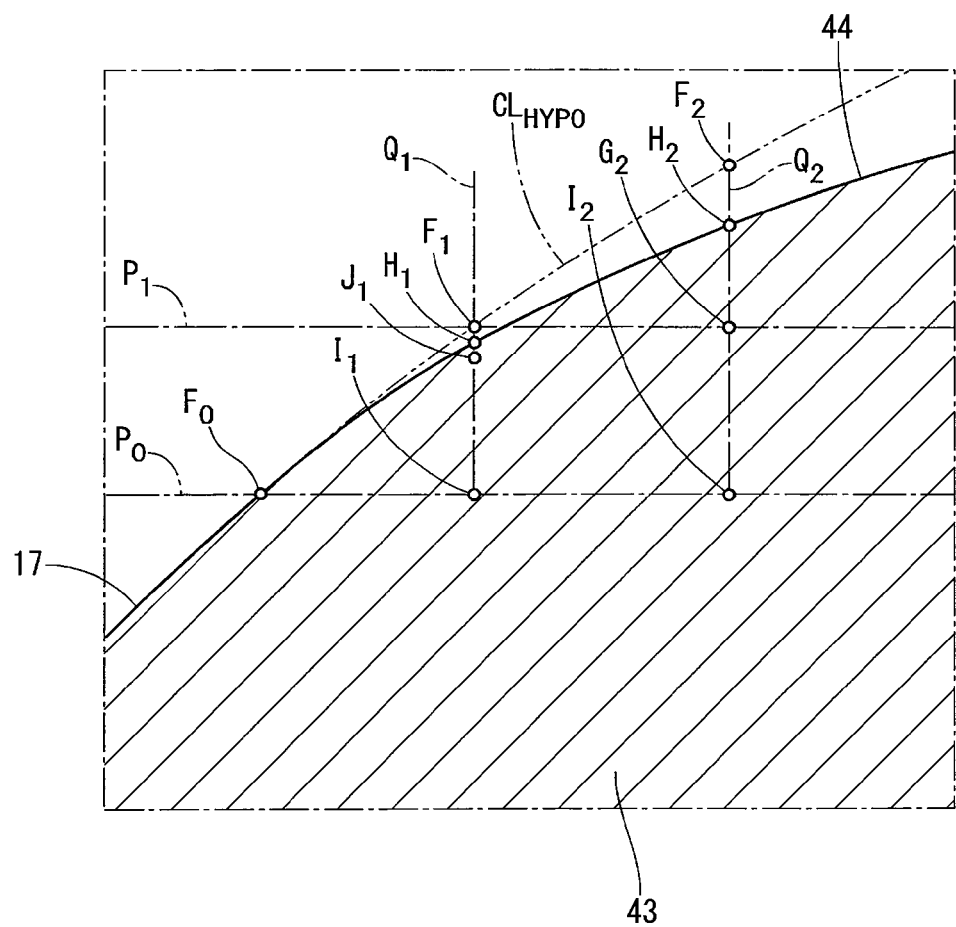
FIG. 10 is a further enlarged view showing a portion X in FIG. 9.

The second tooth-front curved line for the tooth-front portion 44 of the internal gear 43 will be further explained. In FIGS. 9 and 10, each showing the transverse cross-sectional shape for the tooth-front portion 44 of the external gear 43, respective reference signs are defined as below:

(2-1) "$F_0$" is a connecting point, at which the second tooth-front curved line for the tooth-front portion 44 is continuously connected to the curved line for the tooth-middle portion 17 (hereinafter, the connecting point "$F_0$");

(2-2) "$F_N$" is a most-front point, which is located at a most-radial-inside position of the reference hypocycloid curved line "$CL_{HYPO}$" (hereinafter, the most-front point "$F_N$");

(2-3) "t2" is a second runout amount, which corresponds to a distance between the most-front point "$F_N$" and a most-front point of the tooth-front portion 44 of the internal gear 43 (hereinafter, the second runout amount "t2");

(2-4) "$F_1$" to "$F_{N-1}$" are points of division, each of which corresponds to respective points of division when the reference hypocycloid curved line "$CL_{HYPO}$" between the connecting point "$F_0$" and the most-front point "$F_N$" is equally divided into N-number portions along the reference hypocycloid curved line "$CL_{HYPO}$", wherein the points of division are located in a direction from the connecting point "$F_0$" to the most-front point "$F_N$" (hereinafter, the division point "$F_1$" to the division point "$F_{N-1}$");

(2-5) "$P_0$" is a circle, which is concentrically located with the second pitch circle "Sp2" and passes over the connecting point "$F_0$" (hereinafter, the first circle "$P_0$");

(2-6) "$P_1$" is a circle, which is concentrically located with the second pitch circle "Sp2" and passes over the division point "$F_1$" (hereinafter, the second circle "$P_1$");

(2-7) "$Q_N$" is a straight line, which connects the most-front point "$F_N$" to the center axis "AX1" corresponding to the center of the second pitch circle "Sp2" (hereinafter, the central straight line "$Q_N$");

(2-8) "$Q_1$" to "$Q_{N-1}$" are straight lines, each of which is parallel to the central straight line "$Q_N$" and passes over the respective division points "$F_1$" to "$F_{N-1}$" (hereinafter, the straight lines "$Q_1$" to "$Q_{N-1}$");

(2-9) "$G_2$" to "$G_N$" are intersection points, at each of which the second circle "$P_1$" intersects with the respective straight lines "$Q_2$" to "$Q_N$" (hereinafter, the intersection points "$G_2$" to "$G_N$");

(2-10) "$H_N$" is a runout point, which corresponds to the most-front point "$F_N$" when the most-front point "$F_N$" is moved by the second runout amount "t2" in a direction to the intersection point "$G_N$" along the central straight line "$Q_N$" (hereinafter, the central runout point "$H_N$");

(2-11) "K" is an integral number from "2 (two)" to "N−1" (hereinafter, the integral number "K");

(2-12) "$H_K$" is a runout point, which is located on the straight line "$Q_K$" and satisfies the following condition

[a line segment "$F_K H_K$":a line segment "$H_K G_K$"=a line segment "$F_N H_N$":a line segment "$H_N G_N$"]

(hereinafter, the runout point "$H_K$");

(2-13) "$I_2$" is an intersection point between the straight line "$Q_2$" and the first circle "$P_0$" (hereinafter, the intersection point "$I_2$");

(2-14) "$I_1$" is an intersection point between the straight line "$Q_1$" and the first circle "$P_0$" (hereinafter, the intersection point "$I_1$");

(2-15) "$J_1$" is a transfer point, which is located on the straight line "$Q_1$" and satisfies the following condition

[a line segment "$F_1 J_1$":a line segment "$J_1 I_1$"=a line segment "$F_2 H_2$":a line segment "$H_2 I_2$"]

(hereinafter, the transfer point "$J_1$"); and (2-16) "$H_1$" is a runout point, which is a middle point between the division point "$F_1$" and the transfer point "$J_1$".

The tolerances of the respective parts and/or components as well as clearances among the respective parts and/or components are taken into consideration when deciding the second runout amount "t2". Namely, the second runout amount "t2" is so decided that a possible contact between the tooth-front portions 42 and 44 of the external gear 41 and the internal gear 43 can be avoided in the teeth non-engagement region (in the condition of FIG. 8) between the external and the internal gears 41 and 43.

The connecting point "$F_0$" is decided as such a position (a position on a face of the internal gear tooth of the internal gear 43), which is closer to the second pitch circle "Sp2" as much as possible to an extent that the internal gear 43 is not brought into contact with the external gear 41 (that is, in a range which does not make a contribution to a torque transmission) when the external and the internal gears 41 and 43 are in the teeth non-engagement region. The above extent (the range) is experimentally obtained based on the wear status of the face of the internal gear tooth of the internal gear 43. In a similar manner to the first embodiment, the wear status is obtained by way of experiment, according to which the planetary gear train of the internal engagement type is operated, wherein the transverse cross-sectional shape of the tooth-front portion 44 of the internal gear 43 is formed by the reference hypocycloid curved line "$CL_{HYPO}$".

A division number "N" is properly selected from numbers from 10 to 50. A ratio of the line segment (that is, the line segment "$F_N H_N$": the line segment "$H_N G_N$") is properly selected from a range of ratio from "1:9" to "3:2".

In the present embodiment, the division number "N" is decided as "50" and the ratio of the line segment "$F_N H_N$: $H_N G_N$" is decided as "1:2". Then, the ratio of the line segment (the line segment "$F_2 H_2$":the line segment "$H_2 I_2$") becomes almost "1:9".

The transverse cross-sectional shape (that is, the second tooth-front curved line) of the tooth-front portion 44 of the internal gear 43 is an interpolation curved line, which passes over the connecting point "$F_0$" and the runout points "$H_1$" to "$H_N$" respectively defined by the above definitions (2-1) to (2-16). For example, a spline curved line is used for the interpolation curved line.

The runout point "$H_1$" is so decided based on the above definitions (2-13) to (2-16) that each of the interpolation curved lines becomes a convex curved line expanding in a radial-outward direction.

Advantages of Second Embodiment

As explained above, the transverse cross-sectional shape for the tooth-front portion 44 of the internal gear 43 is formed by the second tooth-front curved line, which is located at the position closer to the second pitch circle "Sp2" than the reference hypocycloid curved line "$CL_{HYPO}$" in the radial-outward direction of the internal gear 43. The reference hypocycloid curved line "$CL_{HYPO}$" is continuously connected to each of the curved lines for the tooth-middle portion 17 at both circumferential sides of the tooth-front portion 44 of the internal gear 43.

According to the above structure, the tooth-front portion 44 of the internal gear 43 is so formed that each point on the second tooth-front curved line is escaped in the radial-outward direction from the reference hypocycloid curved line "$CL_{HYPO}$".

In other words, when compared with a comparison example having the reference hypocycloid curved line "$CL_{HYPO}$" at the tooth-front portion of the internal gear, the tooth-front portion 44 of the present embodiment has the runout portion in order to avoid the possible contact with the tooth-front portion 42 of the external gear 41.

According to the present embodiment, therefore, it is possible to avoid the contact between the tooth-front portions 44 and 42 of the internal gear 43 and the external gear 41 in the teeth non-engagement region between the internal and the external gears 43 and 41, as shown in FIG. 8.

As a result, like the first embodiment, it is possible in the second embodiment to avoid the decrease of the torque transmission efficiency. In addition, it is possible not only to reduce a manufacturing cost for the gears 41 and 43 but also to prevent a shortage of the grease.

In the present embodiment, the transverse cross-sectional shape of the tooth-front portion 44 is formed by the interpolation curved line, which passes over the connecting point "$F_0$" and the runout points "$H_1$" to "$H_N$" respectively defined by the above definitions (2-1) to (2-16).

According to the above structure, it is possible not only to escape a part of the tooth-front portion 44 by the desired second runout amount "t2" in the radial-outward direction from the reference hypocycloid curved line "$CL_{HYPO}$" but also to form the outer shape of the tooth-front portion 44 by the smoothly convex curved line expanded in the radial-inward direction.

As a result, like the first embodiment, it is possible in the second embodiment to avoid a situation that the rotation of the external gear 41 is locked by the unexpected engagement (the getting-stuck condition) between the external gear 41 and the internal gear 43.

First Modification of Second Embodiment

The above definition (2-4) for the division points "$F_1$" to "$F_{N-1}$" may be modified in the following manner.

(2-4: First modification) "$F_1$" to "$F_{N-1}$" are points of division, each of which corresponds to respective points of division when the reference hypocycloid curved line "$CL_{HYPO}$" between the connecting point "$F_0$" and the most-front point "$F_N$" is divided into N-number portions at equal angles around the center of the second pitch circle "Sp2", wherein the points of division are located in a direction from the connecting point "$F_0$" to the most-front point "$F_N$" (hereinafter, the division point "$F_1$" to the division point "$F_{N-1}$").

Second Modification of Second Embodiment

The above definition (2-4) for the division points "$F_1$" to "$F_{N-1}$" may be further modified in the following manner.

(2-4: Second modification) "$F_1$" to "$F_{N-1}$" are points of division, each of which corresponds to respective points of division when a second predetermined curved line between the connecting point "$F_0$" and the most-front point "$F_N$" is divided into N-number portions, wherein the points of division are located in a direction from the connecting point "$F_0$" to the most-front point "$F_N$". The reference hypocycloid curved line "$CL_{HYPO}$" and a pair of curved lines for the tooth-middle portion 17 respectively connected to each end of the reference hypocycloid curved line "$CL_{HYPO}$" (which correspond to the curved lines forming the transverse cross-sectional shape of the tooth-middle portion at both circumferential sides of the tooth-front portion) are replaced by the above second predetermined curved line.

The second predetermined curved line is obtained in the following manner;

A second rolling circle having a radius "b" is circumscribed to the second pitch circle "Sp2" (having a radius "r2"). The second rolling circle is rotated around the center of the second pitch circle "Sp2" by an angle of "360×b/r2", while a circumscribed condition is maintained between the second rolling circle and the second pitch circle "Sp2". A certain point on the circumference of the second rolling circle draws a curved line during the above rotation by the angle of "360×b/r2", which corresponds to the above second predetermined curved line (a hypocycloid curved line).

In addition, the second predetermined curved line coincides with a spline curved line, which is obtained in the following manner;

A value "x" and a value "y" are respectively calculated from the following formulas (3) and (4):

$$x=(r2-b)\times\sin(360\times b\times t/r2)-b\times\sin(360\times(r2-b)\times t/r2) \qquad (3)$$

$$y=(r2-b)\times\cos(360\times b\times t/r2)+b\times\cos(360\times(r2-b)\times t/r2) \qquad (4)$$

Multiple values for "x" and "y" are obtained from the above formulas (3) and (4) by changing "t" in a range between "0" and "1" at intervals of "1/M". "M" is set at a value, for example, "50". The spline curved line is obtained as a curved line, which passes over all of points plotted by the respective values of "x" and "y".

Third Embodiment

Characterizing features of the planetary gear train of the internal engagement type according to a third embodiment will be explained with reference to FIGS. 11 to 12.

Figure 11:
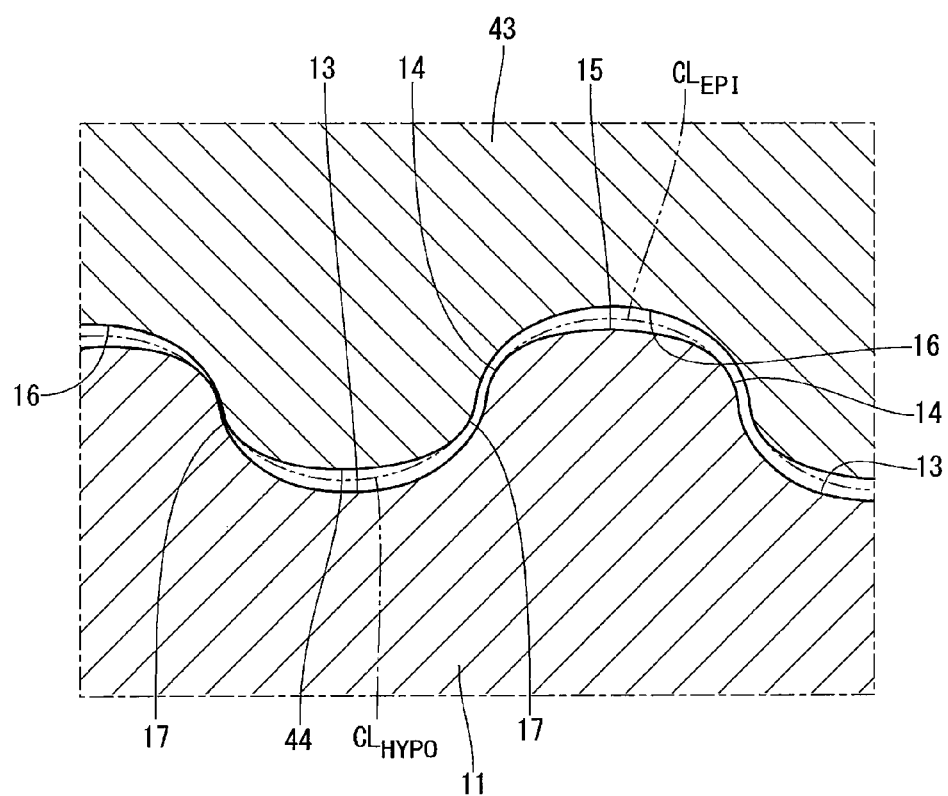
FIG. 11 is an enlarged schematic cross sectional view showing a portion of the speed decreasing device according to a third embodiment of the present disclosure, namely showing the respective teeth of the external gear and the internal gear which are in the teeth engagement region like FIG. 3.
Figure 12:
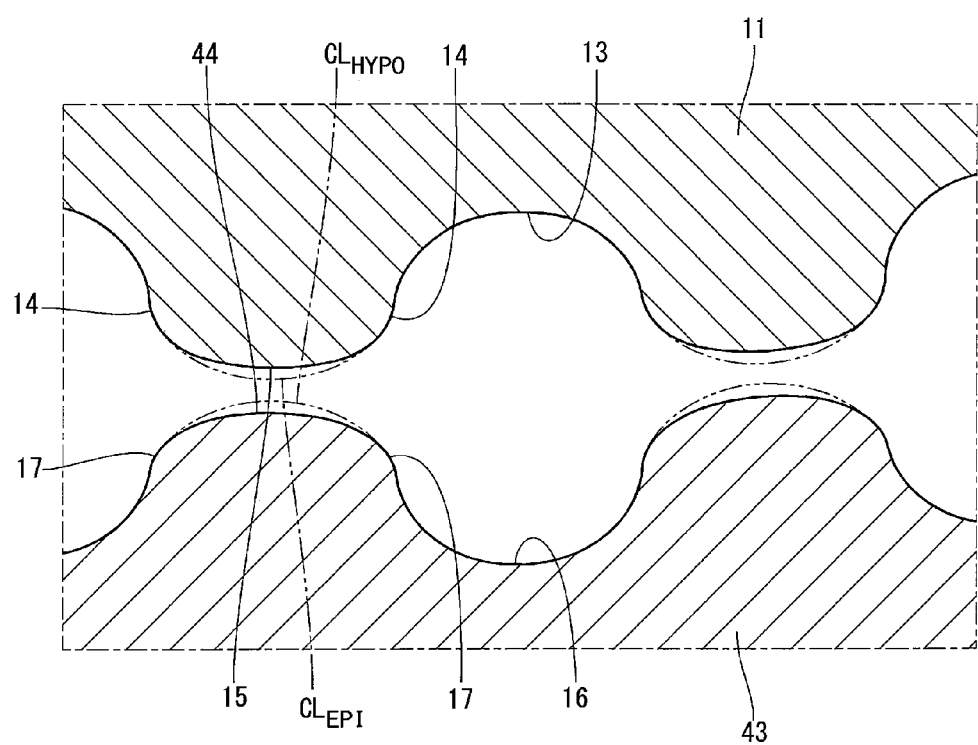
FIG. 12 is an enlarged schematic cross sectional view showing a portion of the speed decreasing device according to the third embodiment of the present disclosure, namely showing the respective teeth of the external gear and the internal gear which are in the teeth non-engagement region like FIG. 4.

As shown in FIGS. 11 and 12, each of the tooth-front portions 15 and 44 of the external gear 11 and the internal gear 43 has a runout portion. More exactly, in the same manner to the first embodiment, the first runout portion is formed in the external gear 11 in such a way that the tooth-front portion 15 of the external gear 11 is escaped in the radial-inward direction from the reference epicycloid curved line "$CL_{EPI}$". In addition, in the same manner to the second embodiment, the second runout portion is formed in the internal gear 43 in such a way that the tooth-front portion 44 of the internal gear 43 is escaped in the radial-outward direction from the reference hypocycloid curved line "$CL_{HYPO}$".

Accordingly, the same advantages to the first and the second embodiments can be obtained in the third embodiment. In other words, it is possible to prevent the decrease of the torque transmission efficiency, to reduce the manufacturing cost and to prevent the shortage of the grease.

Further Embodiments and/or Modifications

In the above embodiments, the transverse cross-sectional shape of the tooth-front portion of the external gear and/or the internal gear is formed by the interpolation curved line, which corresponds to the spline curved line.

The interpolation curved line is not limited to the spline curved line but any other curved line, which may be obtained by a different interpolation method, can be used for the interpolation curved line. For example, a Lagrange's interpolation curved line, a polynomial interpolation curved line, a Bezier's curved line or the like may be used as the interpolation curved line for the transverse cross-sectional shape of the tooth-front portions.

The runout point "$C_1$" for the external gear 15 is not limited to the point defined by the definitions (1-13) to (1-16). Any other point can be set as the runout point, so long as each point on the curved line forming the transverse cross-sectional shape of the tooth-front portion of the external gear satisfies that each point is expanded in the radial outward direction. According to such structure, it is possible to avoid the situation that the rotation of the external gear is locked by the unexpected engagement (the getting-stuck condition) between the external gear and the internal gear.

In the same manner, the runout point "$H_1$" for the internal gear 43 is not limited to the point defined by the definitions (2-13) to (2-16). Any other point can be set as the runout point, so long as each point on the curved line forming the transverse cross-sectional shape of the tooth-front portion of the internal gear satisfies that each point is expanded in the radial-inward direction. According to such structure, it is possible to avoid the situation that the rotation of the external gear is locked by the unexpected engagement (the getting-stuck condition) between the external gear and the internal gear.

The planetary gear train of the internal engagement type may be applied not to the speed decreasing device but to a speed increasing device. In addition, the planetary gear train of the internal engagement type may be applied to any other driving device than the shift-by-wire system.

The present disclosure should not be limited to the above explained embodiments and/or the modifications, but can be further modified in various manners without departing from a spirit of the present disclosure.

What is claimed is:

1. A planetary gear train of an internal engagement type comprising:
    an internal gear having multiple internal gear teeth at an inner peripheral portion of the internal gear, each of the internal gear teeth having a tooth-bottom portion, a tooth-middle portion and a tooth-front portion; and
    an external gear having multiple external gear teeth at an outer peripheral portion of the external gear, each of the external gear teeth having a tooth-bottom portion, a tooth-middle portion and a tooth-front portion, and the tooth-middle portion of the external gear being internally and operatively engaged with the tooth-middle portion of the internal gear,
    wherein some of the external gear teeth are operatively engaged with some of the internal gear teeth in a teeth engagement area, while some of the remaining external gear teeth are dis-engaged from some of the remaining internal gear teeth in a teeth non-engagement area so that the tooth-front portion of the external gear is separated from the tooth-front portion of the internal gear in a radial direction of the external gear,
    wherein the tooth-bottom portion of the external gear is located at a radial-inside position of a first pitch circle of the external gear, the tooth-middle portion of the external gear is located at a radial-outside position of the first pitch circle and operatively in contact with the internal gear, and the tooth-front portion of the external gear is located at a radial-outside position of the tooth-middle portion of the external gear,
    wherein the tooth-bottom portion of the internal gear is located at a radial-outside position of a second pitch circle of the internal gear, the tooth-middle portion of the internal gear is located at a radial-inside position of the second pitch circle and operatively in contact with the external gear, and the tooth-front portion of the internal gear is located at a radial-inside position of the tooth-middle portion of the internal gear, and
    wherein transverse cross-sectional shapes of the internal gear and the external gear are formed in the following manners, the transverse cross-sectional shape corresponding to a cross-sectional shape on a transverse plane perpendicular to a center axis of the internal gear:
    a transverse cross-sectional shape of the tooth-bottom portion of the internal gear is formed by an epicycloid curved line;
    each of transverse cross-sectional shapes of the tooth-middle portion and the tooth-front portion of the internal gear is formed by a hypocycloid curved line;
    a transverse cross-sectional shape of the tooth-bottom portion of the external gear is formed by a hypocycloid curved line;
    a transverse cross-sectional shape of the tooth-middle portion of the external gear is formed by an epicycloid curved line, wherein the tooth-middle portion of the external gear is located at the radial-outside position adjacent to the first pitch circle; and
    a transverse cross-sectional shape of the tooth-front portion of the external gear is formed by a first predetermined curved line, which is located at a position closer to the first pitch circle in a radial-inward direction from a reference epicycloid curved line in order to avoid a contact between the tooth-front portion of the external gear and the tooth-front portion of the internal gear in the teeth non-engagement area, wherein the reference epicycloid curved line is continuously connected to each of the curved lines for the tooth-middle portion of the external gear, each of the curved lines for the tooth-middle portion of the external gear being respectively connected to each end of the first predetermined curved line for the tooth-front portion of the external gear at both circumferential sides thereof.

2. The planetary gear train according to claim 1, wherein the transverse cross-sectional shape of the tooth-front portion of the external gear is formed by an interpolation curved line, which passes over connecting points "$A_0$" and runout points "$C_1$" to "$C_N$" in each of the external gear teeth of the external gear,
    wherein the connecting point "$A_0$" and the runout points "$C_1$" to "$C_N$" are respectively defined by the following manners:
    a point, at which the tooth-front portion is continuously connected to the tooth-middle portion, is defined as the connecting point "$A_0$";
    a point, which is located at a most-radial-outside position of the reference epicycloid curved line, is defined as a most-front point "$A_N$";
    an amount, which corresponds to a distance between the most-front point "$A_N$" of the reference epicycloid curved line and a most-front point of the first predetermined curved line for the tooth-front portion, is defined as a first runout amount "t1";
    respective points, each of which corresponds to a respective point of division when the reference epicycloid curved line between the connecting point "$A_0$" and the most-front point "$A_N$" is divided into N-number portions, are defined as a division point "$A_1$" to a division point "$A_{N-1}$", wherein the division points "$A_1$" to "$A_{N-1}$" are located in a direction from the connecting point "$A_0$" to the most-front point "$A_N$";

a circle, which is concentrically located with the first pitch circle "Sp1" and passes over the connecting point "$A_0$" is defined as a first circle "$S_0$";

a circle, which is concentrically located with the first pitch circle "Sp1" and passes over the division point "$A_1$" is defined as a second circle "$S_1$";

a straight line, which connects the most-front point "$A_N$" to a center axis "AX2" of the first pitch circle "Sp1", is defined as a central straight line "$L_N$";

straight lines, each of which is parallel to the central straight line "$L_N$" and passes over the respective division points "$A_1$" to "$A_{N-1}$", are respectively defined as straight lines "$L_1$" to "$L_{N-1}$"

intersection points, at each of which the second circle "$S_1$" intersects with the respective straight lines "$L_2$" to "$L_N$", are respectively defined as intersection points "$B_2$" to "$B_N$";

a point, which corresponds to the most-front point "$A_N$" when the most-front point "$A_N$" is moved by the first runout amount "t1" in a direction to the intersection point "$B_N$" along the central straight line "$L_N$", is defined as a central runout point "$C_N$";

a number from "2" to "N−1" is defined as an integral number "K";

a point, which is located on the straight line "$L_K$" and satisfies the following condition, is defined as a runout point "$C_K$";

[a line segment "$A_K C_K$":a line segment "$C_K B_K$"=a line segment "$A_N C_N$":a line segment "$C_N B_N$"];

an intersection point between the straight line "$L_2$" and the first circle "$S_0$" is defined as an intersection point "$D_2$";

an intersection point between the straight line "$L_1$" and the first circle "$S_0$" is defined as an intersection point "$D_1$";

a transfer point, which is located on the straight line "$L_1$" and satisfies the following condition, is defined as a transfer point "$E_1$":

[a line segment "$A_1 E_1$":a line segment "$E_1 D_1$"=a line segment "$A_2 C_2$":a line segment "$C_2 D_2$"]; and a point, which is a middle point between the division point "$A_1$" and the transfer point "$E_1$", is defined as a runout point "$C_1$".

3. A planetary gear train of an internal engagement type comprising:

an internal gear having multiple internal gear teeth at an inner peripheral portion of the internal gear, each of the internal gear teeth having a tooth-bottom portion, a tooth-middle portion and a tooth-front portion; and an external gear having multiple external gear teeth at an outer peripheral portion of the external gear, each of the external gear teeth having a tooth-bottom portion, a tooth-middle portion and a tooth-front portion, and the tooth-middle portion of the external gear being internally and operatively engaged with the tooth-middle portion of the internal gear, wherein some of the external gear teeth are operatively engaged with some of the internal gear teeth in a teeth engagement area, while some of the remaining external gear teeth are dis-engaged from some of the remaining internal gear teeth in a teeth non-engagement area so that the tooth-front portion of the external gear is separated from the tooth-front portion of the internal gear in a radial direction of the external gear, wherein the tooth-bottom portion of the external gear is located at a radial-inside position of a first pitch circle of the external gear, the tooth-middle portion of the external gear is located at a radial-outside position of the first pitch circle and operatively in contact with the internal gear, and the tooth-front portion of the external gear is located at a radial-outside position of the tooth-middle portion of the external gear, wherein the tooth-bottom portion of the internal gear is located at a radial-outside position of a second pitch circle of the internal gear, the tooth-middle portion of the internal gear is located at a radial-inside position of the second pitch circle and operatively in contact with the external gear, and the tooth-front portion of the internal gear is located at a radial-inside position of the tooth-middle portion of the internal gear, and wherein transverse cross-sectional shapes of the internal gear and the external gear are formed in the following manners, the transverse cross-sectional shape corresponding to a cross-sectional shape on a transverse plane perpendicular to a center axis of the internal gear;

a transverse cross-sectional shape of the tooth-bottom portion of the external gear is formed by a hypocycloid curved line;

each of the transverse cross-sectional shapes of the tooth-middle portion and the tooth-front portion of the external gear is formed by an epicycloid curved line;

a transverse cross-sectional shape of the tooth-bottom portion of the internal gear is formed by an epicycloid curved line;

a transverse cross-sectional shape of the tooth-middle portion of the internal gear is formed by a hypocycloid curved line, wherein the tooth-middle portion of the internal gear is located at the radial-inside position adjacent to the second pitch circle; and a transverse cross-sectional shape of the tooth-front portion of the internal gear is formed by a second predetermined curved line, which is located at a position closer to the second pitch circle in a radial-outward direction from a reference hypocycloid curved line in order to avoid a contact between the tooth-front portion of the external gear and the tooth-front portion of the internal gear in the teeth non-engagement area, wherein the reference hypocycloid curved line is continuously connected to each of the curved lines for the tooth-middle portion of the internal gear, each of the curved lines for the tooth-middle portion of the internal gear being respectively connected to each end of the second predetermined curved line for the tooth-front portion of the internal gear at both circumferential sides thereof.

4. The planetary gear train according to claim 3, wherein the transverse cross-sectional shape of the tooth-front portion of the internal gear is formed by an interpolation curved line, which passes over connecting points "$F_0$" and runout points "$H_1$" to "$H_N$" in each of the internal gear teeth of the internal gear, wherein the connecting point "$F_1$" and the runout points "$H_1$" to "$H_N$" are respectively defined by the following manners;

a point, at which the tooth-front portion of the internal gear is continuously connected to the tooth-middle portion, is defined as the connecting point "$F_0$");

a point, which is located at a most-radial-inside position of the reference hypocycloid curved line "$CL_{HYPO}$", is defined as a most-front point "$F_N$";

an amount, which corresponds to a distance between the most-front point "$F_N$" and a most-front point of the second predetermined curved line for the tooth-front portion, is defined as a second runout amount "t2";

respective points, each of which corresponds to respective points of division when the reference hypocycloid curved line "$CL_{HYPO}$" between the connecting point "$F_0$" and the most-front point "$F_N$" is divided into N-number portions, are defined as a division point "$F_1$" to a division point "$F_{N-1}$", wherein the division points "$F_1$" to "$F_{N-1}$" are located in a direction from the connecting point "$F_0$" to the most-front point "$F_N$";

a circle, which is concentrically located with the second pitch circle and passes over the connecting point "$F_0$", is defined as a first circle "$P_0$";

a circle, which is concentrically located with the second pitch circle and passes over the connecting point "$F_1$", is defined as a second circle "$P_1$";

a straight line, which connects the most-front point "$F_N$" to the center axis "AX1" of the second pitch circle, is defined as a central straight line "$Q_N$";

straight lines, each of which is parallel to the central straight line "$Q_N$" and passes over the respective division points "$F_1$" to "$F_{N-1}$", are respectively defined as straight lines "$Q_1$" to "$Q_{N-1}$";

intersection points, at each of which the second circle "$P_1$" intersects with the respective straight lines "$Q_2$" to "$Q_N$", are respectively defined as intersection points "$G_2$" to "$G_N$";

a point, which corresponds to the most-front point "$F_N$" when the most-front point "$F_N$" is moved by the second runout amount "t2" in a direction to the intersection points "$G_N$" along the central straight line "$Q_N$", is defined as a central runout point "$H_N$";

a number from "2" to "N−1" is defined as an integral number "K";

a point, which is located on the straight line "$Q_K$" and satisfies the following condition, is defined as a runout point "$H_K$":

[a line segment "$F_K H_K$":a line segment "$H_K G_K$"=a line segment "$F_N H_N$":a line segment "$H_N G_N$"];

an intersection point between the straight line "$Q_2$" and the first circle "$P_0$" is defined as an intersection point "$I_2$";

an intersection point between the straight line "$Q_1$" and the first circle "$P_0$" is defined as an intersection point "$I_1$";

a point, which is located on the straight line "$Q_1$" and satisfies the following condition, is defined as a transfer point "$J_1$":

[a line segment "$F_1 J_1$":a line segment "$J_1 I_1$"=a line segment "$F_2 H_2$":a line segment "$H_2 I_2$"; and a point, which is a middle point between the division point "$F_1$" and the transfer point "$J_1$", is defined as a runout point "$H_1$".

5. A planetary gear train of an internal engagement type comprising:

an internal gear having multiple internal gear teeth at an inner peripheral portion of the internal gear, each of the internal gear teeth having a tooth-bottom portion, a tooth-middle portion and a tooth-front portion; and an external gear having multiple external gear teeth at an outer peripheral portion of the external gear, each of the external gear teeth having a tooth-bottom portion, a tooth-middle portion and a tooth-front portion, and the tooth-middle portion of the external gear being internally and operatively engaged with the tooth-middle portion of the internal gear, wherein some of the external gear teeth are operatively engaged with some of the internal gear teeth in a teeth engagement area, while some of the remaining external gear teeth are dis-engaged from some of the remaining internal gear teeth in a teeth non-engagement area so that the tooth-front portion of the external gear is separated from the tooth-front portion of the internal gear in a radial direction of the external gear, wherein the tooth-bottom portion of the external gear is located at a radial-inside position of a first pitch circle of the external gear, the tooth-middle portion of the external gear is located at a radial-outside position of the first pitch circle and operatively in contact with the internal gear, and the tooth-front portion of the external gear is located at a radial-outside position of the tooth-middle portion of the external gear, wherein the tooth-bottom portion of the internal gear is located at a radial-outside position of a second pitch circle of the internal gear, the tooth-middle portion of the internal gear is located at a radial-inside position of the second pitch circle and operatively in contact with the external gear, and the tooth-front portion of the internal gear is located at a radial-inside position of the tooth-middle portion of the internal gear, and wherein transverse cross-sectional shapes of the internal gear and the external gear are formed in the following manners, the transverse cross-sectional shape corresponding to a cross-sectional shape on a transverse plane perpendicular to a center axis of the internal gear;

a transverse cross-sectional shape of the tooth-bottom portion of the external gear is formed by a hypocycloid curved line;

a transverse cross-sectional shape of the tooth-middle portion of the external gear is formed by an epicycloid curved line, wherein the tooth-middle portion of the external gear is located at the radial-outside position adjacent to the first pitch cirlce;

a transverse cross-sectional shape of the tooth-front portion of the external gear is formed by a first predetermined curved line, which is located at a position closer to the first pitch circle in a radial-inward direction from a reference epicycloid curved line in order to avoid a contact between the tooth-front portion of the external gear and the tooth-front portion of the internal gear in the teeth non-engagement area, wherein the reference epicycloid curved line is continuously connected to each of the curved lines for the tooth-middle portion of the external gear, each of the curved lines for the tooth-middle portion of the external gear being respectively connected to each end of the first predetermined curved line for the tooth-front portion of the external gear at both circumferential sides thereof;

a transverse cross-sectional shape of the tooth-bottom portion of the internal gear is formed by an epicycloid curved line;

a transverse cross-sectional shape of the tooth-middle portion of the internal gear is formed by a hypocycloid curved line, wherein the tooth-middle portion of the internal gear is located at the radial-inside position adjacent to the second pitch circle; and a transverse cross-sectional shape of the tooth-front portion of the internal gear is formed by a second predetermined curved line, which is located at a position closer to the second pitch circle in a radial-outward direction from a reference hypocycloid curved line in order to avoid the contact between the tooth-front portion of the external gear and the tooth-front portion of the internal gear in the teeth non-engagement area, wherein the reference hypocycloid curved line is continuously connected to each of the curved lines for the tooth-middle portion of the internal gear, each of the curved lines for the tooth-middle portion of the internal gear being respectively connected to each end of the second predetermined curved line for the tooth-front portion of the internal gear at both circumferential sides thereof.

6. The planetary gear train according to claim 5, wherein the transverse cross-sectional shape of the tooth-front portion of the external gear is formed by an interpolation curved line, which passes over connecting points "$A_0$" and runout points "$C_1$" to "$C_N$" in each of the external gear teeth of the external gear, wherein the connecting point "$A_0$" and the runout points "$C_1$" to "$C_N$" are respectively defined by the following manners:

a point, at which the tooth-front portion is continuously connected to the tooth-middle portion, is defined as the connecting point "$A_0$";

a point, which is located at a most-radial-outside position of the reference epicycloid curved line, is defined as a most-front point "$A_N$";

an amount, which corresponds to a distance between the most-front point "$A_N$" of the reference epicycloid curved line and a most-front point of the first predetermined curved line for the tooth-front portion, is defined as a first runout amount "t1";

respective points, each of which corresponds to a respective point of division when the reference epicycloid curved line between the connecting point "$A_0$" and the most-front point "$A_N$" is divided into N-number portions, are defined as a division point "$A_1$" to a division point "$A_{N-1}$", wherein the division points "$A_1$" to "$A_{N-1}$" are located in a direction from the connecting point "$A_0$" to the most-front point "$A_N$";

a circle, which is concentrically located with the first pitch circle "Sp1" and passes over the connecting point "$A_0$" is defined as a first circle "$S_0$";

a circle, which is concentrically located with the first pitch circle "Sp1" and passes over the division point "$A_1$" is defined as a second circle "$S_1$";

a straight line, which connects the most-front point "$A_N$" to a center axis "AX2" of the first pitch circle "Sp1", is defined as a central straight line "$L_N$";

straight lines, each of which is parallel to the central straight line "$L_N$" and passes over the respective division points "$A_1$" to "$A_{N-1}$", are respectively defined as straight lines "$L_1$" to "$L_{N-1}$"

intersection points, at each of which the second circle "$S_1$" intersects with the respective straight lines "$L_2$" to "$L_N$", are respectively defined as intersection points "$B_2$" to "$B_N$";

a point, which corresponds to the most-front point "$A_N$" when the most-front point "$A_N$" is moved by the first runout amount "t1" in a direction to the intersection point "$B_N$" along the central straight line "$L_N$", is defined as a central runout point "$C_N$";

a number from "2" to "N−1" is defined as an integral number "K";

a point, which is located on the straight line "$L_K$" and satisfies the following condition, is defined as a runout point "$C_K$":

[a line segment "$A_K C_K$":a line segment "$C_K B_K$"=a line segment "$A_N C_N$":a line segment "$C_N B_N$"];

an intersection point between the straight line "$L_2$" and the first circle "$S_0$" is defined as an intersection point "$D_2$";

an intersection point between the straight line "$L_1$" and the first circle "$S_0$" is defined as an intersection point "$D_1$";

a transfer point, which is located on the straight line "$L_1$" and satisfies the following condition, is defined as a transfer point "$E_1$":

[a line segment "$A_1 E_1$":a line segment "$E_1 D_1$"=a line segment "$A_2 C_2$":a line segment "$C_2 D_2$"]; and a point, which is a middle point between the division point "$A_1$" and the transfer point "$E_1$", is defined as a runout point "$C_1$".

7. The planetary gear train according to claim 5, wherein the transverse cross-sectional shape of the tooth-front portion of the internal gear is formed by an interpolation curved line, which passes over connecting points "$F_0$" and runout points "$H_1$" to "$H_N$" in each of the internal gear teeth of the internal gear, wherein the connecting point "$F_0$" and the runout points "$H_1$" to "$H_N$" are respectively defined by the following manners:

a point, at which the tooth-front portion of the internal gear is continuously connected to the tooth-middle portion, is defined as the connecting point "$F_0$";

a point, which is located at a most-radial-inside position of the reference hypocycloid curved line, is defined as a most-front point "$F_N$";

an amount, which corresponds to a distance between the most-front point "$F_N$" and a most-front point of the second predetermined curved line for the tooth-front portion, is defined as a second runout amount "t2";

respective points, each of which corresponds to respective points of division when the reference hypocycloid curved line between the connecting point "$F_0$" and the most-front point "$F_N$" is divided into N-number portions, are defined as a division point "$F_1$" to a division point "$F_{N-1}$", wherein the division points "$F_1$" to "$F_{N-1}$" are located in a direction from the connecting point "$F_0$" to the most-front point "$F_N$";

a circle, which is concentrically located with the second pitch circle and passes over the connecting point "$F_0$", is defined as a first circle;

a circle, which is concentrically located with the second pitch circle and passes over the connecting point "$F_1$", is defined as a second circle;

a straight line, which connects the most-front point "$F_N$" to the center axis "AX1" of the second pitch circle "Sp2", is defined as a central straight line "$Q_N$";

straight lines, each of which is parallel to the central straight line "$Q_N$" and passes over the respective division points "$F_1$" to "$F_{N-1}$", are respectively defined as straight lines "$Q_1$" to "$Q_{N-1}$";

intersection points, at each of which the second circle "$P_1$" intersects with the respective straight lines "$Q_2$" to "$Q_N$", are respectively defined as intersection points "$G_2$" to "$G_N$";

a point, which corresponds to the most-front point "$F_N$" when the most-front point "$F_N$" is moved by the second runout amount "t2" in a direction to the intersection points "$G_N$" along the central straight line "$Q_N$", is defined as a central runout point "$H_N$";

a number from "2" to "N−1" is defined as an integral number "K";

a point, which is located on the straight line "$Q_K$" and satisfies the following condition, is defined as a runout point "$H_K$":

[a line segment "$F_K H_K$":a line segment "$H_K G_K$"=a line segment "$F_N H_N$":a line segment "$H_N G_N$"];

an intersection point between the straight line "$Q_2$" and the first circle "$P_0$" is defined as an intersection point "$I_2$";

an intersection point between the straight line "$Q_1$" and the first circle "$P_0$" is defined as an intersection point "$I_1$";

a point, which is located on the straight line "$Q_1$" and satisfies the following condition, is defined as a transfer point "$J_1$":

[a line segment "$F_1 J_1$":a line segment "$J_1 I_1$"=a line segment "$F_2 H_2$":a line segment "$H_2 I_2$"; and a point, which is a middle point between the division point "$F_1$" and the transfer point "$J_1$", is defined as a runout point "$H_1$".

* * * * *